United States Patent [19]

Grote et al.

[11] Patent Number: 5,069,839

[45] Date of Patent: Dec. 3, 1991

[54] PROCESS FOR INCREASING THE FIRING SHRINKAGE OF CERAMIC FILM CASTING MIXTURES

[75] Inventors: Dieter Grote; Fritz Müller; Heinz Pavlicek, all of Marktredwitz, Fed. Rep. of Germany

[73] Assignee: Hoechst Ceramtec Aktiengesellschaft, Selb, Fed. Rep. of Germany

[21] Appl. No.: 649,321

[22] Filed: Jan. 31, 1991

Related U.S. Application Data

[63] Continuation of Ser. No. 324,726, Mar. 17, 1989, abandoned.

[30] Foreign Application Priority Data

Mar. 19, 1988 [DE] Fed. Rep. of Germany ....... 3809350

[51] Int. Cl.$^5$ ............................................ C04B 35/64
[52] U.S. Cl. ..................................... 264/63; 264/212; 264/211.11; 264/60; 264/216; 264/166; 501/136; 501/88; 501/97; 501/127
[58] Field of Search ................ 427/96, 126.3; 264/63, 264/171, 212, 211.11, 216, 166; 501/136, 88, 97, 127, 153

[56] References Cited

U.S. PATENT DOCUMENTS

| | | | |
|---|---|---|---|
| 3,717,487 | 2/1973 | Hurley et al. | 501/134 |
| 3,988,405 | 10/1976 | Smith et al. | 264/63 |
| 3,991,149 | 11/1976 | Hurwitt | 264/63 |
| 4,025,462 | 5/1977 | Cleveland | 264/63 |
| 4,109,377 | 8/1978 | Blazick et al. | 427/96 |
| 4,548,879 | 10/1985 | St. John et al. | 427/96 |
| 4,587,068 | 5/1986 | Borase et al. | 264/63 |
| 4,654,223 | 3/1987 | Araps et al. | 427/96 |
| 4,670,325 | 5/1987 | Bakos et al. | 427/96 |
| 4,816,072 | 3/1989 | Harley et al. | 264/63 |

*Primary Examiner*—William R. Dixon, Jr.
*Assistant Examiner*—Paul Marcantoni
*Attorney, Agent, or Firm*—Foley & Lardner

[57] ABSTRACT

The firing shrinkage of ceramic film casting mixtures can be increased by adding a high molecular weight mixed ester or a mixture of various high molecular weight mixed esters to them. The ceramic material of the ceramic film casting mixtures is composed preferably of lead titanate, silicon carbide, silicon nitride, beryllium oxide or aluminum oxide. Preferably, the mixed esters are derived from at least one $C_2$–$C_{10}$-dicarboxylic acid and at least one $C_8$–$C_{24}$-monocarboxylic acid. The proportion of high molecular weight mixed ester in the film casting mixture amounts to up to 5% by weight, based on the proportion of solids in the casting mixture, including sintering aids.

The process makes it possible to alter the composition of a slip and still use the old tools which require an unaltered firing shrinkage.

6 Claims, No Drawings

PROCESS FOR INCREASING THE FIRING SHRINKAGE OF CERAMIC FILM CASTING MIXTURES

This application is a continuation of application Ser. No. 324,726, field Mar. 17, 1989, now abandoned.

BACKGROUND OF THE INVENTION

The present application relates to a process for increasing the firing shrinkage of ceramic slips for producing films by adding a high molecular weight mixed ester or a mixture of various such mixed esters to said slip.

Films composed of ceramic mixtures, for example of lead titanate, silicon carbide or aluminum oxide, can be produced by casting from so-called slips (slip casting). In this connection, slip is understood to mean a slurry of ceramic materials in a solvent (generally organic) which also additionally contains binders and plasticizers. Said slip is then poured, for example, onto a continuously travelling metal or plastic strip. On the strip, the slip is dried and a flexible ceramic film is produced which is continuously peeled off the strip. Such a ceramic film can readily be further processed with suitably shaped tools. The organic constituents are subsequently evaporated from the film by heating and the latter is finally sintered at high temperature to form the actual substrate. Film casting is dealt with in a general form in Keramischen Zeitschrift 38. No. 2 (1986), pages 79-82. Mixed phthalic acid esters are also mentioned therein as a plasticizing constituent of film casting mixtures.

The ceramic film contracts both during the evaporation of the organic constituents and also during sintering (shrinkage, in particular firing shrinkage). This means, however, that the firing shrinkage has to be allowed for in advance in producing the tools for shaping the films; i.e. that, for example, in producing a "ceramic card", the latter has to be punched out larger than the required "final dimensions" demand. In most cases, the "longitudinal shrinkage" and "transverse shrinkage" of a ceramic film is determined once and the tools are then designed accordingly, in other words, the firing shrinkage is regarded as a characteristic parameter of the ceramic film.

If the composition of the slip is now changed, be it by replacing one solvent by another or by replacing or varying the amount of the plasticizer or the binder or be it by using ceramic basic materials of different origin, different particle size or the like, the firing shrinkage will also alter and this has the result that the tools are no longer correctly dimensioned and the required "final dimensions" of the substrates are no longer maintained.

The production of new, correctly dimensioned tools is very cost-intensive and generally out of the question.

A reduction in the firing shrinkage may possibly still be achieved with relatively little difficulty by reducing, for example, the proportion of solvents.

An increase in the firing shrinkage, on the other hand, cannot usually be achieved in a simple manner—for example, by increasing the proportion of binder, plasticizer or solvent.

SUMMARY OF THE INVENTION

An object of the present invention is to increase the firing shrinkage of ceramic film casting mixtures in a simple manner.

According to the present invention such an increase in the firing shrinkage can be achieved by incorporating small quantities of a high molecular weight mixed ester in the film casting mixture.

The invention provides a process for increasing the firing shrinkage of ceramic film casting mixtures, which comprises adding at least one high molecular weight mixed ester to said film casting mixtures.

According to the present invention, particularly suitable film casting mixtures are aluminum oxide and beryllium oxide casting mixtures. However, the amounts of the high molecular weight mixed ester required for use in other film casting mixtures such as lead titanate, silicon carbide or silicon nitride casting mixtures, can also be determined by determination in simple test series.

Usually, such film casting mixtures (slips) are produced a.) a ceramic materials such as:
   lead titanate, silicon carbide, silicon nitride, beryllium oxide or corundum, with standard sintering aids such as MgO, $SiO_2$ or $ZrO_2$ being added, b.) a solvent such as:
   methanol, ethanol, isobutyl alcohol, trichloroethylene, trichloroethane or toluene, c.) a plasticizer such as:
   esters of dicarboxylic acids such as phthalic acid, adipic acid or sebacic acid formed with aliphatic and/or aromatic monohydric alcohols such as butanol, hexanol or benzyl alcohol, but also corresponding esters of said alcohols with phosphoric acid or esters of monocarboxylic acids with polyhydric alcohols such as the esters of triethylene glycol with aliphatic monocarboxylic acids containing 6 to 8 carbon atoms and ethers of long-chain alcohols such as the monoisotridecyl ether of triethylene glycol and d.) a binder such as:
   polyvinylbutyral (commercially available polyvinylbutyrals are terpolymers which contain, in addition to vinylbutyral units, approx. 0.5 to 3% by weight of vinyl acetate units and 12 to 28% by weight of vinyl alcohol units).

A high molecular weight mixed ester is understood to mean mixed esters formed from aliphatic or aromatic dicarboxylic acids and fatty acids (monocarboxylic acids) with polyhydric aliphatic alcohols such as ethylene glycol, glycerol and, in particular, pentaerythritol. The boiling point of these esters is above 150° C., in particular above 200° C., preferably above 250° C. In particular, mixed esters formed from one or more different aliphatic or aromatic $C_2$–$C_{10}$-dicarboxylic acids such as oxalic acid, malonic acid, adipic acid, sebacic acid or phthalic acid and one or more different fatty acids containing 8-24 carbon atoms ($C_8$–$C_{24}$-monocarboxylic acids) such as capric acid, lauric acid, myristic acid, palmitic acid or stearic acid with polyhydric aliphatic alcohols such as ethylene glycol, glycerol and, in particular, pentaerythritol are suitable. An example of this is a high molecular weight complex ester composed of 4 mol of adipic acid, 5 mol of pentaerythritol and 12 mol of tallow fatty acid or oleic acid. The high molecular weight complex ester may also be composed of 7 mol of pentaerythritol, 6 mol of adipic acid and 16 mol of saturated straight-chain aliphatic monocarboxylic acids having a chain length of $C_{16}$–$C_{22}$. This mixture may also incorporate stearyl phthalate in a weight ratio of 1:0-1:1.

The high molecular weight mixed ester is added to the film casting mixture in an amount such that the firing shrinkage again reaches the desired (higher) value. It has emerged that even small amounts of, for example, 0.1 or 0.5% by weight are adequate for this purpose. In most cases, it is not necessary to exceed concentrations of 5% by weight. Preferably, not more than 2% by weight, very particularly preferably not more than 1% by weight, is added (these % by weight refer to the total mixture of the solid ceramic material used, including sintering aids).

With high measured additions, a slight liquifying effect is observed, but this can readily be compensated for, for example, by reducing the solvent constituents.

According to the invention, the high molecular weight mixed ester can also be used to compensate for variations, due to production, in the quality of the ceramic mixture, sintering aids, solvents, binders and/or plasticizers used.

The invention is explained in more detail in the following examples.

EXAMPLE 1

(Comparison example)

Production of a substrate from a film casting mixture

A film casting mixture which contained the following additives was produced from spray-dried $Al_2O_3$ pellets produced by standard processes (grinding of the ceramic raw material in water and spray drying):

| Serial No. | Additive | % by weight |
|---|---|---|
| 1 | Trichloroethylene | 24.6 |
| 2 | Ethanol | 9.7 |
| 3 | $^i$Genapol ® PN 30 | 0.5 |
| 4 | $^{ii}$Tetronic ® 1501 | 0.4 |
| 5 | $^{iii}$Fish oil Kellox Z 3 | 0.5 |
| 6 | Loxiol G 70 | — |
| 7 | $^{iiii}$Mowital ® B 40 H | 3.8 |
| 8 | $^{iiiii}$Palatinol ® AH | 1.5 |

$^i$Genapol PN 30 is a product formed by reacting ethylenediamine with ethylene oxide and propylene oxide. (manufacturer: HOECHST, Gendorf)
$^{ii}$Tetronic 1501 is an alkoxylated diamine (manufacturer: BASF, New Jersey, USA)
$^{iii}$Fish oil Kellox Z 3 (Menhaden fish oil) (manufacturer: Kellogg, USA)
$^{iiii}$Mowital B 40 H is a polyvinylbutyral (see page 3: production of film casting mixtures. d.)) (manufacturer: Hoechst AG, Frankfurt)
$^{iiiii}$Palatinol AH (dioctyl phthalate) (manufacturer: BASF, Ludwigshafen)

The spray-dried $Al_2O_3$ pellets were first mixed with the additives 1-5 (20 hours) and then the additives 7 and 8 were added and mixing was carried out for a further 20 hours.

The resultant casting mixture was poured onto a steel strip to form 0.7-1.0 mm thick films, dried, cut and fired at 1,600° C. The film have a firing shrinkage of 17.4% compared with the "green" film.

EXAMPLE 2

Production of a substrate from a film casting mixture

A second film casting mixture containing the following additives was prepared from the spray-dried $Al_2O_3$ pellets:

| Serial No. | Additive | % by weight |
|---|---|---|
| 1 | Trichlorothylene | 24.0 |
| 2 | Ethanol | 9.4 |
| 3 | Genapol PN 30 | 0.5 |
| 4 | Tetronic 1501 | 0.4 |
| 5 | Fish oil Kellox Z 3 | 0.5 |
| 6 | Loxiol G 70 | 0.5 |
| 7 | Mowital B 40 H | 3.8 |
| 8 | Palatinol AH | 1.5 |

®Loxiol G 70 is a mixed ester based on adipic acid, pentaerythritol and tallow fatty acid (manufacturer: Henkel KGaA, Düsseldorf).

The casting mixture was produced as in Example 1 (mixing of the constituents 1-6 with the spray-dried pellets for 20 hours, addition of the constituents 7 and 8 and mixing for a further 20 hours), dried, cut and fired. Adding 0.5% by weight of Loxiol G 70 resulted in the firing shrinkage of the "green" film increasing to 18.2%.

EXAMPLE 3

Production of a substrate from a film casting mixture

A third film casting mixture containing the following additives was produced from the spray-dried $Al_2O_3$ pellets:

| Serial No. | Additive | % by weight |
|---|---|---|
| 1 | Trichloroethylene | 24.6 |
| 2 | Ethanol | 9.7 |
| 3 | Genapol PN 30 | 0.5 |
| 4 | Tetronic 1501 | 0.4 |
| 5 | Fish oil Kellox Z 3 | 0.5 |
| 6 | Loxiol G 70 | 1.0 |
| 7 | Mowital B 40 H | 3.8 |
| 8 | Palatinol AH | 1.5 |

The casting mixture was produced as in Example 2, dried, cut and fired. The addition of 1.0% by weight of Loxiol G 70 resulted in the firing shrinkage increasing to 19.3% compared with the "green" film.

We claim:

1. A process for preparing ceramic substrates, comprising:
   (a) preparing a ceramic film casting mixture comprising a ceramic material, a plasticizer, a binder and a solvent selected from the group consisting of methanol, ethanol, isobutyl, alcohol, trichlorethylene, trichloroethane and toluene;
   (b) adding to the ceramic film casting mixture at least one high molecular weight mixed ester formed from at least one dicarboxylic acid selected from the group consisting of oxalic acid, malonic acid, adipic acid, sebacic acid and phthalic acid, at least one $C_8$–$C_{24}$—fatty acid and at least one polyhydric aliphatic alcohol;
   (c) forming a slip of the ceramic film casting mixture on a carrier surface;
   (d) drying the slip to a flexible ceramic film; and subsequently
   (e) firing the film.

2. The process as claimed in claim 1, wherein the ceramic material of the ceramic film casting mixture is composed of lead titanate, silicon carbide, silicon nitride, beryllium oxide or aluminum oxide.

3. The process as claimed in claim 1, wherein 0.1 to 5% by weight of high molecular weight mixed ester (based on the solid ceramic constituents of the mixture, including sintering aids is added to the film casting mixture.

4. The process as claimed in claim 1, wherein the $C_8$–$C_{24}$—fatty acid comprises capric acid, lauric acid, myristic acid, palmitic acid, oleic acid, or stearic acid.

5. The process as claimed in claim 1, wherein the mixed ester is formed from 4 mol of adipic acid, 12 mol of tallow fatty acid or oleic acid and 5 mol of pentaerythritol.

6. The process as claimed in claim 1, wherein the mixed ester is formed from 6 mol of adipic acid, 16 mol of saturated straight-chain aliphatic monocarboxylic acids having a chain length of $C_{16}$–$C_{22}$ and 7 mol of pentaerythritol.

* * * * *